US006495262B2

(12) United States Patent
Igeta

(10) Patent No.: US 6,495,262 B2
(45) Date of Patent: Dec. 17, 2002

(54) FLAT DISPLAY PANEL, FLAT DISPLAY DEVICE AND FLAT DISPLAY PANEL MANUFACTURING METHOD

(75) Inventor: Shunichi Igeta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/838,327

(22) Filed: Apr. 20, 2001

(65) Prior Publication Data

US 2001/0038365 A1 Nov. 8, 2001

(30) Foreign Application Priority Data

Apr. 20, 2000 (JP) ........................................ 2000-119304

(51) Int. Cl.[7] ........................ B32B 17/06; G02F 1/1339
(52) U.S. Cl. ........................................ 428/426; 349/153
(58) Field of Search .......................................... 428/426

(56) References Cited

U.S. PATENT DOCUMENTS 6,313,579 B1 * 11/2001 Nakano et al. ............. 313/484

FOREIGN PATENT DOCUMENTS

JP 07-335145 * 12/1995
JP 10-302635 * 11/1998
JP 200030618 1/2000

* cited by examiner

*Primary Examiner*—Deborah Jones
*Assistant Examiner*—G. A. Blackwell-Rudasill
(74) *Attorney, Agent, or Firm*—Birch, Stewart, Kolasch & Birch, LLP

(57) ABSTRACT

A flat display panel and a flat display device are realized in which sealing layers can sufficiently alleviate and absorb strain stress between two substrates which is caused by internal stress of the substrates during sealing process and after cooling process, and which can cancel out disadvantages of an amorphous glass paste and a crystallized glass paste, and a flat display panel manufacturing method is realized which can prevent application of excessive or insufficient pressure to the sealing layers. In a flat display panel formed with at least two substrates (1A) and (1B) sealed together, sealing layers (21*a*) are formed as a stacked structure containing a plurality of layers or formed in a region containing a plurality of stripes, so as to obtain a stable seal. The sealing layers (21*a*) are formed of a crystallized glass paste (2A) and an amorphous glass paste (2B). A pressing force applied in the sealing process is positioned near the sealing layers and inside the position of the sealing layers.

12 Claims, 11 Drawing Sheets

FLAT DISPLAY PANEL, FLAT DISPLAY DEVICE AND FLAT DISPLAY PANEL MANUFACTURING METHOD

BACKGROUND OF THE INVENTION

1. Field of the Invention

The present invention relates to a flat display panel constructed as a hermetically sealed case, such as a plasma display panel, to a flat display device having the flat display panel, and to a method for forming the flat display panel.

2. Description of the Background Art

FIG. 15 shows the structure of an AC-type plasma display device as an example of a flat display device.

In FIG. 15, the AC-type plasma display device 201 has a plasma display panel 111, a plasma display panel driving circuit 202, address electrodes 204, X electrodes 205, and Y electrodes 206. The address electrodes 204, X electrodes 205 and Y electrodes 206 are all plural in number. The electrodes are arranged so that the address electrodes 204 perpendicularly intersect the X and Y electrodes 205 and 206 in a plurality of discharge cells 203 arranged to form a grid in the image display portion 111*a* of the plasma display panel 111.

The address electrodes 204, X electrodes 205 and Y electrodes 206 are all connected to the plasma display panel driving circuit 202 and supplied with driving voltage from the plasma display panel driving circuit 202.

To obtain a desired image in this AC-type plasma display device 201, first, the plasma display panel driving circuit 202 performs addressing operation. More specifically, for the addressing operation, write voltage is applied between the address electrodes 204 and the Y electrodes 206, for example. This causes write discharge between these electrodes to set discharge cells 203 involved in the display operation. As is well known, this operation is write operation in which wall charge is stored in the dielectric in the plasma display panel of the AC-type plasma display device.

Subsequently, the plasma display panel driving circuit 202 performs discharge sustain operation (display operation). More specifically, for the discharge sustain operation, the discharge cells 203 set by the addressing operation are caused to discharge to present a display. For this purpose, sustain voltage is alternately applied between the X electrodes 205 and the Y electrodes 206. This discharge sustain operation causes discharge between the X electrodes 205 and the Y electrodes 206 in the discharge cells 203, displaying an image in the image display portion 111*a*.

When given discharge sustain operation ends, the plasma display panel driving circuit 202 performs erasing operation to change the image displayed in the image display portion 111*a* (operation for eliminating the wall charge). More specifically, erase voltage is applied between the X electrodes 205 and the Y electrodes 206 to eliminate the wall charge.

FIG. 16 shows the structure of a conventional flat display panel 11, e.g. the plasma display panel 111. FIG. 16 is a top view of the flat display panel 11. FIG. 17 is the sectional view taken along the line B—B of FIG. 16. FIG. 18 is a sectional view of the flat display panel 11 in a stage where it has not yet been heated and processed into the condition shown in FIG. 17.

The flat display panel 11 has two substrates 1A and 1B made of glass etc. and a sealing layer 12 for bonding the substrates 1A and 1B together. In the case of a plasma display panel, for example, the substrates 1A and 1B are a display surface glass substrate and a back glass substrate opposing each other. The sealing layer 12 is arranged near and along the peripheries of the substrates 1A and 1B to keep the image display portion 11*a* in a hermetic state.

FIG. 16 shows the substrate 1B with a broken line so that the sealing layer 12 can be seen. FIG. 17 shows barrier ribs 13 sectioning individual discharge cells in the plasma display panel as an example of components in the image display portion 11*a*.

A glass paste is generally used as the material of the sealing layer 12; for example, a thermally soluble material, in which powder of a low-melting-point glass (frit glass) such as $PbO—B_2O_3—SiO_2$ type glass or $PbO—B_2O_3—ZnO$ type glass, is mixed into a solvent together with a binder of nitrocellulose or acrylic resin, a filler of ceramics powder for adjusting the thermal expansion coefficient to those of the substrates 1A and 1B, and so forth. In this specification, "frit glass" stands for glass materials having lower melting points than ordinary glass; e.g. a glass material having a melting point around 400° C. In a broader sense, it stands for glass materials which melt at lower temperatures than the substrates 1A and 1B.

A common sealing procedure is now described referring to the plasma display panel as an example. (1) First, the sealing layer 12 is formed on the display surface glass substrate or on the back glass substrate (on the substrate 1B in the example of FIG. 18) where internal components like the barrier ribs 13 have been previously formed. (2) Prefiring is applied to cause desorption of the binder component in the sealing layer 12. (3) Next, positioning is achieved with the display surface glass substrate and the back glass substrate facing each other. (4) The two glass substrates are fixed with a jig like a clip and appropriate pressure is applied to the sealing layer 12. (5) The entire panel is heated. (6) The panel is cooled and the jig or clip is removed. (7) When the sealing is completed, the entire panel is evacuated, while being heated, through an exhaust tube previously attached to the panel, so as to remove impurity gas adsorbed in the panel. (8) A gas for discharge is entrapped (a mixture gas containing Ne, Xe, etc.) when the panel has reached a given temperature. (9) The exhaust tube is sealed.

Generally, the sealing layer 12 is required to satisfy the following conditions: (a) to have such fluidity that it will easily deform and fuse upon application of external pressure at the sealing temperature, (b) to have such rigidity that it will not deform by atmospheric pressure at the evacuating temperature, (c) to have thermal expansion coefficient at the same level as those of the display surface glass substrate and the back glass substrate so that the substrates will not crack during the sealing process and after the cooling process.

To satisfy the conditions above, the sealing layer 12 has generally been formed by using an amorphous glass paste which contains amorphous frit glass or using a crystallized glass paste which contains crystallized frit glass. The amorphous glass paste has superior fluidity and is not very susceptible to temperature condition. The crystallized glass paste, on the other hand, is poor in fluidity, but provides excellent thermal resisting stability after it is sealed.

Whichever glass paste is used, however, the sealing layer cannot sufficiently alleviate and absorb strain stress between the two substrates which is caused by the internal stress of the two substrates while they are being sealed and after they have been cooled. It is therefore difficult to obtain a large quantity of flat display panels with sufficiently ensured hermetic seal; for example, the hermetic seal of the flat display panel may be broken if the flat display device undergoes external force, such as vibrations and impacts, during its assembly or transportation after cooling, which results in lower yield.

Furthermore, the amorphous glass paste has lower softening point than the crystallized glass paste. Therefore, during the exhausting process following the sealing process, it requires that the temperature be set lower than when the crystallized glass paste is used, which may result in insufficient removal of the impurity gas. The temperature must be set lower because the bonded sealing part will otherwise be re-softened with heat during the exhaust and then the dynamic bonding strength will be reduced or the hermetic seal will be broken to cause leakage of the discharge gas.

On the other hand, the crystallized glass paste, having higher softening point than the amorphous glass paste, has to be heated for a longer time period than the amorphous glass paste to cause crystallization. Moreover, when the temperature distribution largely varies during the heating process, parts where the temperature increases slower will melt while being affected by stress (strain) generated in parts which have hardened earlier, because of the characteristic of the material itself that the melting and the hardening by crystallization are completed where the temperature has increased earlier. It is therefore difficult to uniformly bond the entire panel together.

Furthermore, the bonding part is required to maximize the area of the image display portion while minimizing the width of the sealing layer (the area it occupies on the substrates). When the width of the sealing layer is large, the area of the image display portion will be reduced, or the sealing layer may come in contact with the barrier ribs etc. in the image display portion, and then the path of gas cannot be ensured during the exhaust process. Therefore it is also necessary that the sealing layer provide as uniform width as possible after it is heated.

However, when the crystallized glass paste having poor fluidity is used, it is very difficult to set conditions for the application of external force, so that the sealing layer may provide uneven thickness (uneven flattening) after it has been heated.

Moreover, it has not been clearly known where the jig should be located on the two glass substrates in the step (4) in the above-described sealing process, i.e. in the process step where appropriate pressure is applied to the sealing layer 12 with the two glass substrates fixed with a jig.

FIGS. 19 and 20 show examples of the relation between the position where the pressure is applied and the position where the sealing layer 12 forms; the two substrates 1A and 1B are put into a heating furnace while being pressed by external pressure PS.

In FIG. 19, the distance "a" from the end of the substrate 1A to the position where the pressure PS is applied and the distance "b" from the end of the substrate 1A to the center of the formation width of the sealing layer 12 are set in the ratio of a=b. When the distances are set as a=b, unnecessarily large pressure is applied to the sealing layer 12 and the edges of the glass substrates 1A and 1B will be deformed after they are heated. As a result, the sealing layer 12 is formed in a larger width and hence at a smaller distance from the barrier ribs etc. in the image display portion, in which case it is difficult to ensure the path of gas during the exhaust process.

In FIG. 20, the distance "a" from the end of the substrate 1A to the position of application of the pressure PS and the distance "b" from the end of the substrate 1A to the center of the formation width of the sealing layer 12 are set in the ratio of a>>b. When the distances are set as a>>b, insufficient pressure is applied to the sealing layer 12 and then conditions for bonding the substrates 1A and 1B together cannot be satisfied. If the worst happens, a gap GP may be formed to cause leakage of the discharge gas.

SUMMARY OF THE INVENTION

A first aspect of the present invention is directed to a flat display panel comprising: first and second substrates; and a plurality of sealing layers which adjoin each other, wherein the first and second substrates are sealed together with the plurality of sealing layers and the plurality of sealing layers have different thermal expansion coefficients from each other.

Preferably, according to a second aspect, in the flat display panel, the plurality of sealing layers form a stacked structure between the first and second substrates.

Preferably, according to a third aspect, in the flat display panel, the plurality of sealing layers are arranged side by side between the first and second substrates.

Preferably, according to a fourth aspect, in the flat display panel, the plurality of sealing layers are arranged in a line between the first and second substrates.

Preferably, according to a fifth aspect, in the flat display panel, the plurality of sealing layers comprise a first sealing layer comprising a crystallized glass paste and a second sealing layer comprising an amorphous glass paste.

Preferably, according to a sixth aspect, in the flat display panel, the plurality of sealing layers comprise a first sealing layer having a first thermal expansion coefficient, a second sealing layer having a second thermal expansion coefficient which is lower than the first thermal expansion coefficient, and a third sealing layer provided between the first sealing layer and the second sealing layer and having a third thermal expansion coefficient which is lower than the first thermal expansion coefficient and higher than the second thermal expansion coefficient.

Preferably, according to a seventh aspect, in the flat display panel, the plurality of sealing layers comprise a first sealing layer having a first softening point and a second sealing layer having a second softening point which is lower than the first softening point.

Preferably, according to an eighth aspect, in the flat display panel, the plurality of sealing layers further comprise a third sealing layer provided between the first sealing layer and the second sealing layer, the third sealing layer having a third softening point which is lower than the first softening point and higher than the second softening point.

Preferably, according to a ninth aspect, in the flat display panel, irregularities exist at an interface between the plurality of sealing layers.

A tenth aspect of the present invention is directed to a flat display device comprising: the flat display panel of the first aspect and a flat display panel driving circuit for controlling driving of the flat display panel.

An eleventh aspect of the present invention is directed to a flat display panel manufacturing method comprising a process of providing a sealing layer between first and second substrates and sealing the first and second substrates together by externally applying a pressing force to the first and second substrates to press the first and second substrates together, wherein the pressing force applied in the sealing process is positioned near the sealing layer and inside the position of the sealing layer.

According to the first aspect of the present invention, the plurality of sealing layers adjoining each other have different thermal expansion coefficients from each other. The thermal expansion coefficients of the plurality of sealing layers are set approximately equal respectively to those of the first and second substrates, to the extent that the seal between the first and second substrates will not be broken, and the plurality of sealing layers are appropriately arranged between the first and second substrates. Thus the plurality of sealing layers can gradually alleviate and absorb the strain stress between the two substrates which is caused by the internal stress of the first substrate and the internal stress of the second substrate. This provides a flat display panel with a stabler hermetic seal as compared with a flat display panel having only one sealing layer. The flat display panel can thus be kept hermetically sealed even if the flat display device is subjected to external forces, such as vibrations and shocks, during its assembly process or transportation after cooling, for example.

According to the second aspect, the plurality of sealing layers form a stacked structure between the first and second substrates, which can gradually alleviate and absorb the strain stress between the two substrates which is caused especially by internal stress of the first and second substrates directed in their thickness direction.

According to the third aspect, the plurality of sealing layers are arranged side by side between the first and second substrates, which can gradually alleviate and absorb the strain stress between the two substrates which, especially, is caused by internal stress traversing the sealing layers in the surfaces of the first and second substrates.

According to the fourth aspect, the plurality of sealing layers are arranged in a line between the first and second substrates, which can gradually alleviate and absorb the strain stress between the two substrates which, especially, is caused by internal stress directed in the direction of the line in which the sealing layers are disposed on the surfaces of the first and second substrates.

According to the fifth aspect, the plurality of sealing layers include a first sealing layer containing a crystallized glass paste and a second sealing layer containing an amorphous glass paste. It is therefore possible to make full use of advantages of the two pastes while canceling out their disadvantages.

According to the sixth aspect, a third sealing layer having a third thermal expansion coefficient lower than the first thermal expansion coefficient and higher than the second thermal expansion coefficient is provided between the first sealing layer and the second sealing layer. It is therefore possible to more gradually alleviate and absorb the strain stress between the two substrates which is caused by the internal stress of the first substrate and the internal stress of the second substrate. This provides a flat display panel with a stabler hermetic seal.

According to the seventh aspect, the plurality of sealing layers include a first sealing layer having a first softening point and a second sealing layer having a second softening point lower than the first softening point. Therefore, in the cooling process performed during formation of the plurality of sealing layers, the first sealing layer solidifies first and the second sealing layer solidifies later. Accordingly, in the case of the flat display panel of the second aspect, the second sealing layer can alleviate and absorb strain stress between the substrates which the first sealing layer cannot completely alleviate and absorb. Further, in the case of the flat display panel of the third aspect, the first sealing layer will not be re-softened while being heated in the exhausting process, even though the second sealing layer may be re-softened, which enables stable heating exhaust.

According to the eighth aspect, a third sealing layer having a third softening point lower than the first softening point and higher than the second softening point is provided between the first sealing layer and the second sealing layer. Accordingly, in the case of the flat display panel of the second aspect, the third sealing layer can alleviate and absorb strain stress between the two substrates which the first sealing layer cannot completely alleviate and absorb, and the second sealing layer can alleviate and absorb strain stress between the two substrate which the third sealing layer cannot completely alleviate and absorb. Further, in the case of the flat display panel of the third aspect, the first and third sealing layers will not be re-softened while heated in the exhausting process even though the second sealing layer may be re-softened, which enables stable heating exhaust.

According to the ninth aspect, an interface between the plurality of sealing layers have irregularities and therefore stresses of the sealing layers cancel each other at the interface, which suppresses separation between the sealing layers. This provides a flat display panel with a stabler hermetic seal.

The tenth aspect provides a flat display device having the effects of the flat display panel of the first aspect.

According to the eleventh aspect, the position of application of the pressing force applied during the sealing process is set near the sealing layer and inside the position of the sealing layer. This prevents application of excessive pressure to the sealing layer and thereby prevents the width of the sealing layer from being unnecessarily enlarged. It is therefore easy to ensure the passage of the gas exhausted from the cavity between the first and second substrates. This also suppresses application of insufficient pressure to the sealing layer. Therefore gaps are less apt to form between the first and second substrates. Furthermore, the sealing layer can be formed in almost uniform width along the entire periphery, which prevents nonuniform occurrence of the internal stresses. Moreover, the sealing layer occupies smaller area while maximizing the display area, and also provides uniform sealing width after sealed, as is required for bonding. Deformation of the substrate edges and leakage of the discharge gas are least likely to occur when the ratio between the distance from the substrate edge to the pressing force application position and the distance from the substrate edge to the center of the sealing layer formation width is approximately in the range of 2:1 to 10:1.

The present invention has been made to solve the problems explained earlier, and objects of the present invention are to provide a flat display panel and a flat display device in which the sealing layer can sufficiently alleviate and absorb the strain stress between two substrates which is caused by the internal stresses of the substrates during sealing process and after cooling process, and which can cancel out disadvantages of an amorphous glass paste and a crystallized glass paste, and to provide a flat display panel manufacturing method which prevents application of excessive or insufficient force to the sealing layer.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
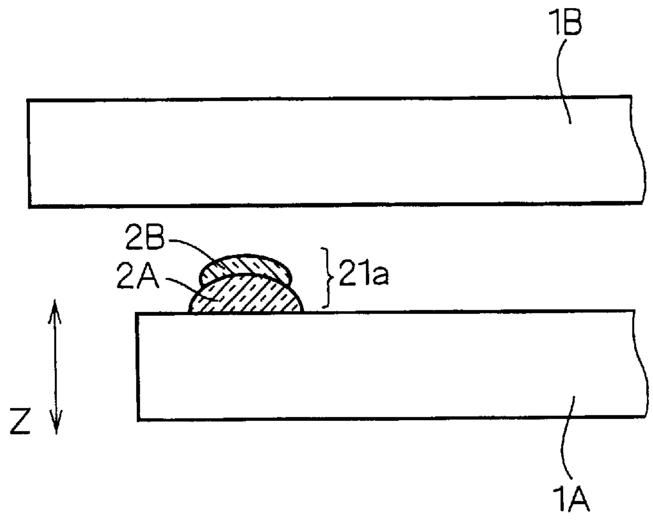
FIG. 1 is a sectional view showing the structure of a flat display panel according to a first preferred embodiment of the present invention, where the flat display panel has not been heated yet.
Figure 2:
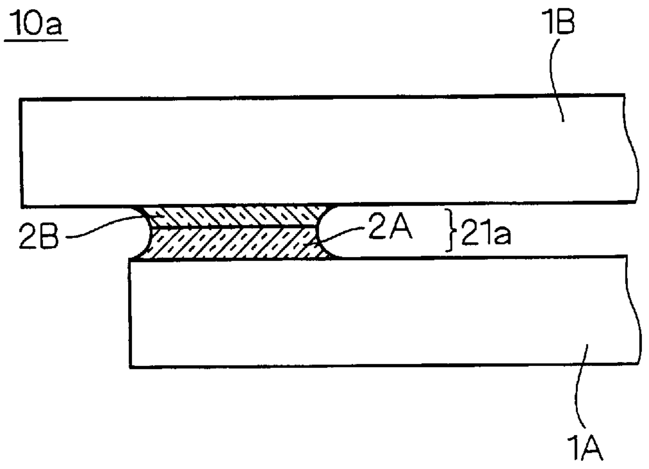
FIG. 2 is a sectional view showing the structure of the flat display panel of the first preferred embodiment of the present invention.

FIG. 2 is a sectional view showing the structure of a flat display panel 10*a* according to a first preferred embodiment of the present invention. FIG. 1 shows the section of the flat display panel which has not yet been heated and processed into the condition of FIG. 2.

Like the conventional flat display panel 11, the flat display panel 10*a* of this preferred embodiment comprises two substrates 1A and 1B made of glass etc. and sealing layers 21*a* for bonding the substrates 1A and 1B together. In the case of a plasma display panel, for example, the substrates 1A and 1B are a display surface glass substrate and a back glass substrate opposing each other. The sealing layers 21*a* are arranged near and along the peripheries of the substrates 1A and 1B to keep the image display portion in a hermetic state. Components of the plasma display device which are required to present image display, such as the electrodes etc., are accommodated in the space surrounded by the substrates 1A and 1B and the sealing layers 21 a forming a hermetically sealed case.

Although a plasma display device will be explained hereinafter as an example of the application of the hermetically sealed case, the application of the present invention, which offers a flat display panel, is not limited to the plasma display device. Also, while a crystallized glass paste and an amorphous glass paste are explained as the materials of the sealing layers, other materials can be used as long as they can achieve desired objects.

Unlike that in the conventional flat display panel 11, the sealing layers 21*a* of this preferred embodiment have a stacked structure including a crystallized glass paste 2A and an amorphous glass paste 2B.

In this stacked structure, the thermal expansion coefficients of the crystallized glass paste 2A and the amorphous glass paste 2B are set approximately equal respectively to those of the substrates 1A and 1B, to the extent that the seal between the substrates 1A and 1B will not be broken; this can be achieved by adjusting materials mixed into the crystallized glass paste 2A and the amorphous glass paste 2B. It should be noted that the thermal expansion coefficients of the crystallized glass paste 2A and the amorphous glass paste 2B are set at different values.

The stacked structure is formed using materials which have different thermal expansion coefficients and different softening points, as the crystallized glass paste 2A and the amorphous glass paste 2B.

While the two-layer structure of the crystallized glass paste 2A and the amorphous glass paste 2B is described herein as an example, it can be a stacked structure having a larger number of layers. Also in such a case, materials having different thermal expansion coefficients and different softening points are used as stated above.

For example, as shown in FIG. 1, the crystallized glass paste 2A is applied on the substrate 1A and the amorphous glass paste 2B is applied on the crystallized glass paste 2A. When the substrates are sealed together in this condition, stresses occurring in the sealing process can be alleviated and absorbed between the multiple layers in the sealing part. This provides a hermetically sealed case which can stay stably airtight after it has been sealed off. The reason is now described.

The sealing layers 21*a* include the crystallized glass paste 2A and the amorphous glass paste 2B; that is, the sealing layers include adjacent layers of different materials whose thermal expansion coefficients are approximately equal respectively to those of the two substrates 1A and 1B, and whose thermal expansion coefficients differ from each other. Therefore, while internal stresses generated in the two substrates 1A and 1B during the sealing process and after the cooling process cause strain stresses between the two substrates, the sealing layers can gradually alleviate and absorb the strain stresses.

For example, suppose that the substrate 1A has an internal stress directed upward in the direction Z shown in FIG. 1 (in the direction of thickness of the substrate 1A) and the substrate 1B has an internal stress directed downward in the direction Z of FIG. 1 (in the thickness direction of the substrate 1B), and that the internal stress of the substrate 1B is smaller than the internal stress of the substrate 1A. In this case, the thermal expansion coefficients are adjusted so that the crystallized glass paste 2A and the amorphous glass paste 2B provide compressive stresses, with the compressive stress of the crystallized glass paste 2A being larger than the compressive stress of the amorphous glass paste 2B. The sealing layers 21*a* can thus gradually alleviate and absorb the strain stresses between the two substrates.

As compared with a conventional flat display panel having only one sealing layer, the hermetic seal can be improved to provide a more stably airtight flat display panel. The hermetic seal of the flat display panel can thus be maintained even when the flat display device undergoes external forces, such as vibrations and shocks, during its assembly process or transportation after cooling.

In this preferred embodiment, the crystallized glass paste 2A and the amorphous glass paste 2B are not mixed into one paste but are used as separate materials to form the sealing layers 21 a because of the reason above.

Further, when the plurality of materials of the sealing layers 21 a form a stacked structure between the two substrates 1A and 1B as shown in this preferred embodiment, it is possible to gradually alleviate and absorb the strain stress between the two substrates which, especially, is caused by the internal stresses in the thickness direction of the two substrates 1A and 1B.

Furthermore, when the sealing layers contain materials having different softening points, as in the case of the crystallized glass paste 2A and the amorphous glass paste 2B, the crystallized glass paste 2A having a higher softening point solidifies first and then the amorphous glass paste 2B having a lower softening point solidifies. Therefore the amorphous glass paste 2B can alleviate and absorb strain stress between the substrates which the crystallized glass paste 2A cannot completely alleviate and absorb.

Moreover, the sealing layers containing the crystallized glass paste 2A and the amorphous glass paste 2B as shown in this preferred embodiment can make full use of advantages of the two pastes, while canceling out their disadvantages.

That is to say, when the amorphous glass paste is used alone, the temperature must be set lower in the exhausting process than when the crystallized glass paste is used alone. However, when the sealing layers contain the crystallized glass paste 2A and the amorphous glass paste 2B as in this preferred embodiment, the crystallized glass paste 2A will not re-soften and thus serve, to some extent, to maintain the hermetic seal. It is therefore possible, to some extent, to ensure the hermetic seal even when the temperature is set somewhat higher than in conventional process. This, of course, compensates for reduction in dynamic strength etc., so that the hermetically sealed case can stay airtight more stably after it has been evacuated.

On the other hand, when the crystallized glass paste, whose softening point is higher than that of the amorphous glass paste, is used alone, it must be heated for a longer time period than the amorphous glass paste to cause crystallization. However, when the sealing layers contain the crystallized glass paste 2A and the amorphous glass paste 2B as shown in this preferred embodiment, the heating time for causing crystallization can be set shorter by adjusting the amount ratio between the crystallized glass paste 2A and the amorphous glass paste 2B.

Furthermore, when the crystallized glass paste is used alone, it is difficult to achieve uniform bonding over the entire panel: when the temperature distribution largely varies during heating, parts where the temperature increases slower melt while being affected by stress (strain) occurring in parts which have hardened earlier. Moreover, since the crystallized glass paste has poor fluidity, it is difficult to set conditions for the application of external pressure, so that the sealing layers may form uneven thickness after heated. However, when the sealing layers contain the crystallized glass paste 2A and the amorphous glass paste 2B as in this preferred embodiment, the amorphous glass paste 2B penetrates into parts where the crystallized glass paste cannot achieve uniform bonding, thus enabling uniform bonding.

Figure 3:
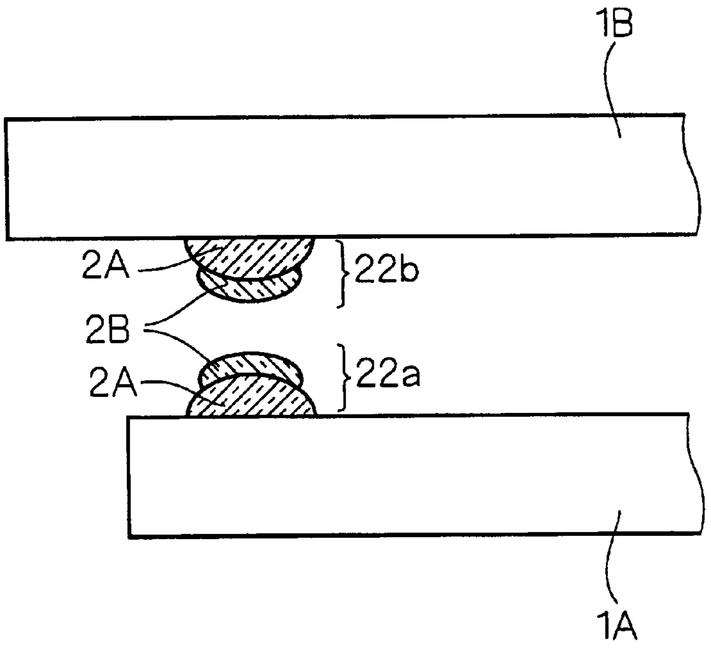
FIG. 3 is a sectional view showing the structure of a variation of the flat display panel of the first preferred embodiment of the present invention, where the flat display panel has not been heated yet.
Figure 4:
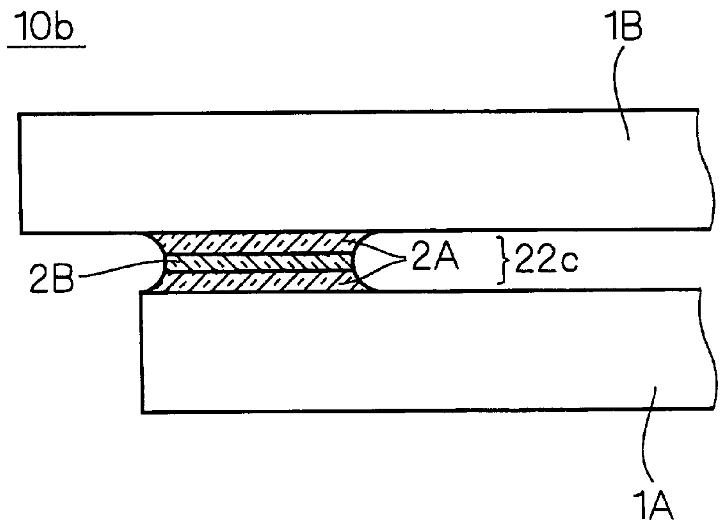
FIG. 4 is a sectional view showing the structure of the variation of the flat display panel of the first preferred embodiment of the present invention.

FIG. 3 shows an example where the sealing layers are formed on each of the substrates 1A and 1B. In this way, sealing layers 22*a* and 22*b* of the crystallized glass paste 2A and the amorphous glass paste 2B may be formed on both substrates; the substrates are then bonded together to form a flat display panel 10*b* as shown in FIG. 4. FIG. 4 shows an example in which the amorphous glass paste 2B in the sealing layers 22*a* and 22*b* are united together to form the sealing layer 22*c*. While, in this example, the crystallized glass paste 2A is disposed on both of the substrates 1A and 1B and the amorphous glass paste 2B is disposed on the crystallized glass paste 2A, they may be stacked in the opposite order, or may be put in the opposite order only on one of the substrates.

A procedure for sealing the flat display panel according to this preferred embodiment is now described, where the flat display panel 10*a* is described as an example. (1) First, the sealing layers 21*a* are formed on the substrate 1A on which internal components, such as the barrier ribs, have been previously formed. The crystallized glass paste 2A is applied on the substrate 1A, which is dried and then pre-fired. (2) Next, similarly, the amorphous glass paste 2B is applied on the crystallized glass paste 2A, dried, and pre-fired. The sealing materials are applied on the glass substrate generally by: a dispenser method where the materials are dispensed from a nozzle to draw desired shape; a printing method where a given pattern is transferred through a screen; a preform method where a sealing material previously formed in a given shape is put on the glass substrate. The drying process is performed at 120 to 150° C. for about 10 minutes, and the pre-firing is performed at 380 to 400° C. for about 10 to 15 minutes for the crystallized glass paste 2A and at about 380° C. for about 10 to 15 minutes for the amorphous glass paste 2B. (3) Then positioning is achieved with the substrate 1A and the substrate 1B facing each other. (4) The two substrates are then fixed with a jig like a clip and appropriate pressure is applied to the sealing layers 21*a*. (5) The entire panel is heated. (6) The panel is cooled and the jig or clip is removed. (7) After the seal has been completed, the entire panel is evacuated, while being heated, through an exhaust tube previously attached to the panel, so as to remove impurity gas adsorbed in the panel. (8) A gas for discharge (a mixture gas containing Ne, Xe, etc.) is entrapped when the panel has reached a given temperature. (9) The exhaust tube is then sealed.

In the flat display panel of this preferred embodiment, a stress alleviating layer may be provided between the crystallized glass paste 2A and the amorphous glass paste 2B so as to alleviate the stress between the two.

Figure 5:
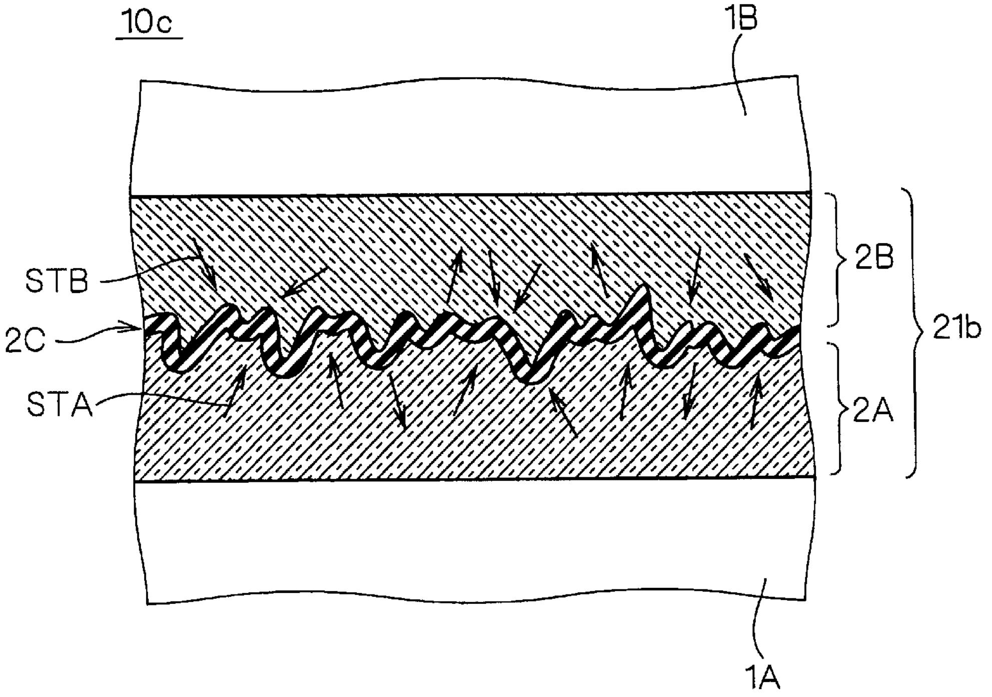
FIG. 5 is a sectional view showing the structure of a variation of the flat display panel of the first preferred embodiment of the present invention.

FIG. 5 is an enlarged view showing a flat display panel 10*c* which has been already heated and cooled, where the sealing layers 21*b* contain a stress alleviating layer 2C. In the seal where different sealing materials, i.e. the crystallized glass paste 2A and the amorphous glass paste 2B, are stacked in the thickness direction of the substrate 1A, another sealing material is provided as the stress alleviating layer 2C to alleviate and absorb internal stresses of the two materials.

For a method for forming this structure, the stress alleviating layer 2C is provided between the crystallized glass paste 2A and the amorphous glass paste 2B in the process of stacking them as shown in FIG. 1. The stress alleviating layer 2C is formed by using a material whose thermal expansion coefficient and softening point are respectively intermediate between the thermal expansion coefficients and softening points of the crystallized glass paste 2A and the amorphous glass paste 2B. More specifically, it can be a mixture of the crystallized glass paste 2A and the amorphous glass paste 2B.

Since the stress alleviating layer 2C thus has a thermal expansion coefficient intermediate between the thermal expansion coefficients of the crystallized and amorphous glass pastes 2A and 2B, it is possible to more gradually alleviate and absorb the strain stress between the two substrates 1A and 1B which is caused by their internal stresses. This offers a flat display panel having a more stable hermetic seal. Also, since the stress alleviating layer 2C thus has a softening point intermediate between the softening points of the crystallized and amorphous glass pastes 2A and 2B, it can alleviate and absorb strain stress between the two substrates which the crystallized glass paste 2A cannot completely alleviate and absorb, and the amorphous glass paste 2B can alleviate and absorb strain stress between the two substrates which the stress alleviating layer cannot completely alleviate and absorb.

As shown in FIG. 5, the boundary between the crystallized glass paste 2A and the amorphous glass paste 2B actually forms an irregular plane rather than a flat plane. Thus, at the boundary between the materials, the internal stresses STA in the crystallized glass paste 2A and the internal stresses STB in the amorphous glass paste 2B are opposing each other in various directions. Therefore the stresses of the two materials cancel each other, so that the materials are less likely to separate from each other. This provides a flat display panel having a stabler hermetic seal. This applies regardless of whether the stress alleviating layer 2C is present or absent.

Figure 15:
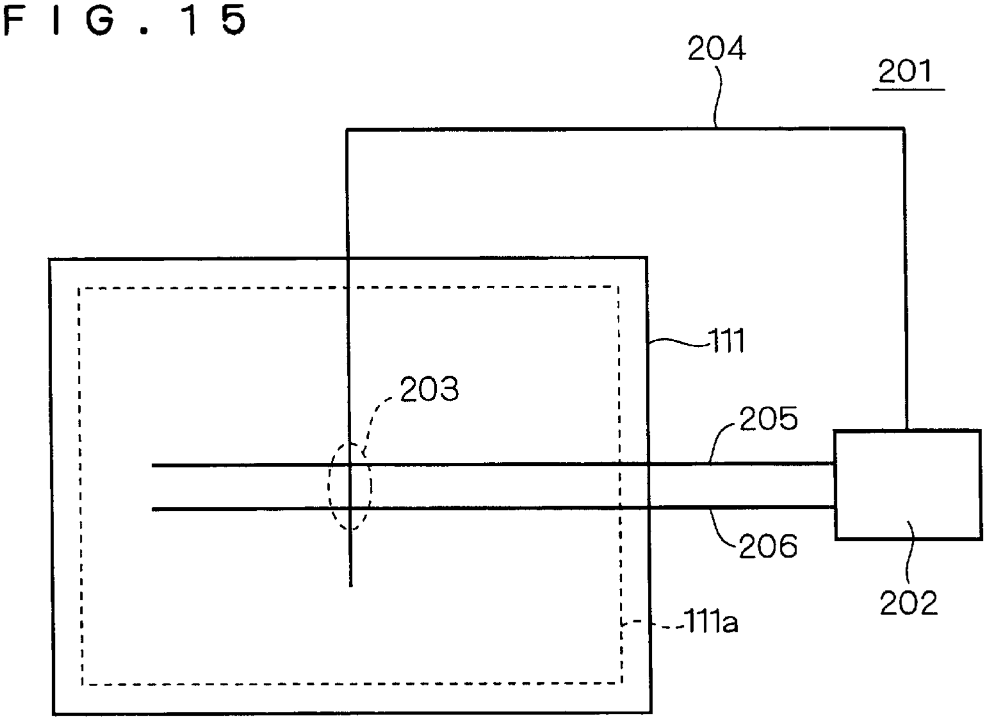
FIG. 15 is a diagram showing the structure of a plasma display device as an example of a flat display device.
Figure 16:
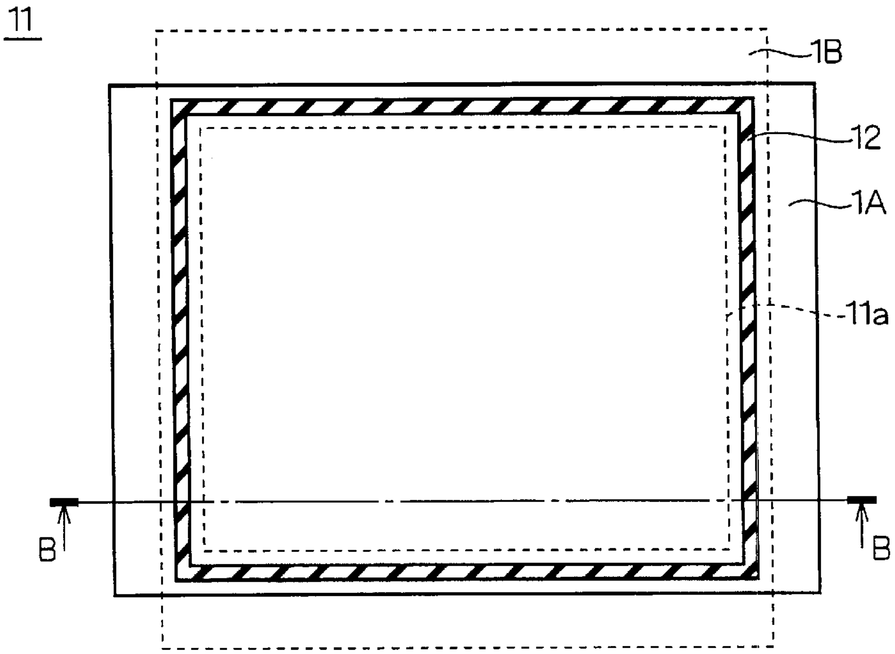
F I G . 1 6 (BACKGROUND ART)
FIG. 16 is a top view showing the structure of a conventional flat display panel 11.
Figure 17:
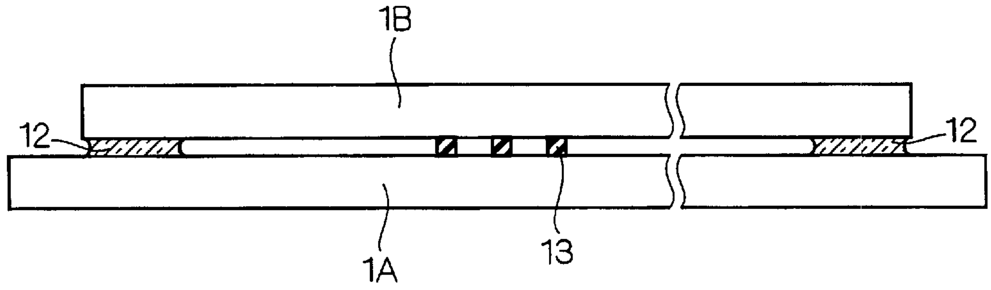
F I G . 1 7 (BACKGROUND ART)
FIG. 17 is a sectional view showing the structure of the conventional flat display panel 11.
Figure 18:
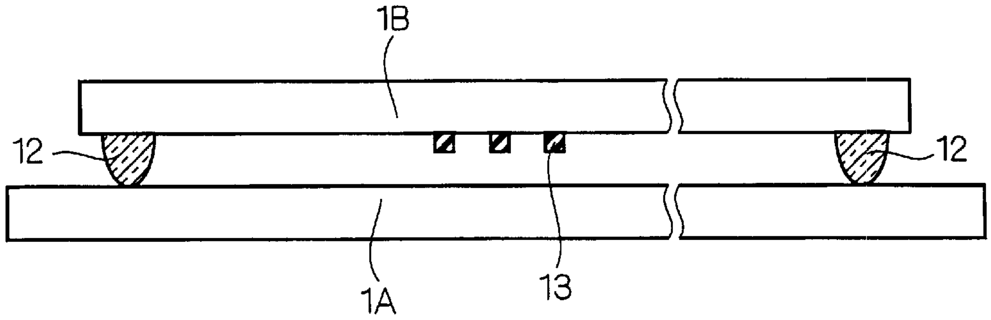
F I G . 1 8 (BACKGROUND ART)
FIG. 18 shows the section of the flat display panel 11 which has not yet been heated and processed into the condition shown in FIG. 17.
Figure 19:
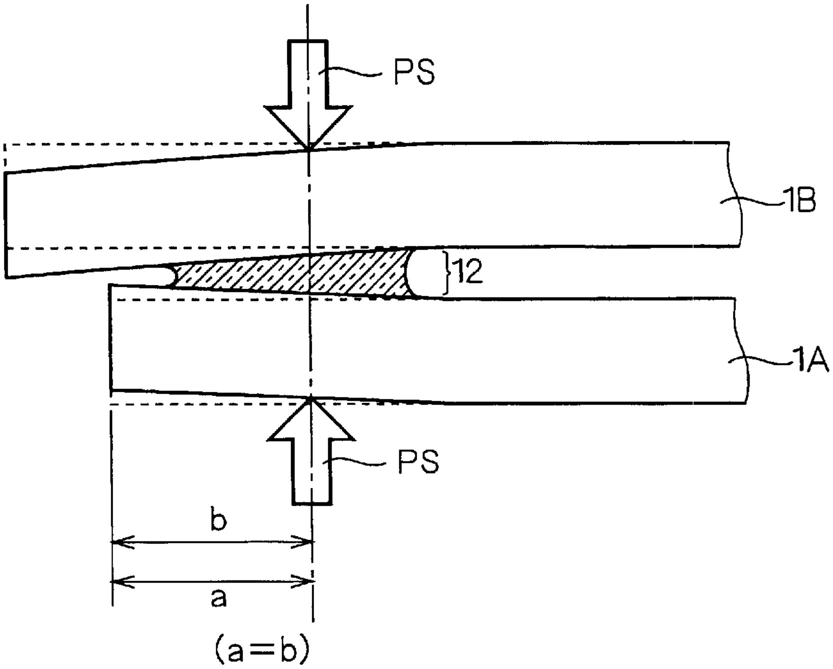
FIGS. 19 and 20 are diagrams showing examples of the relation between the pressurizing position and the formation position of the sealing layer 12 in the process in which the substrates 1A and 1B are put into a heating furnace with pressure PS externally applied thereto.
Figure 20:
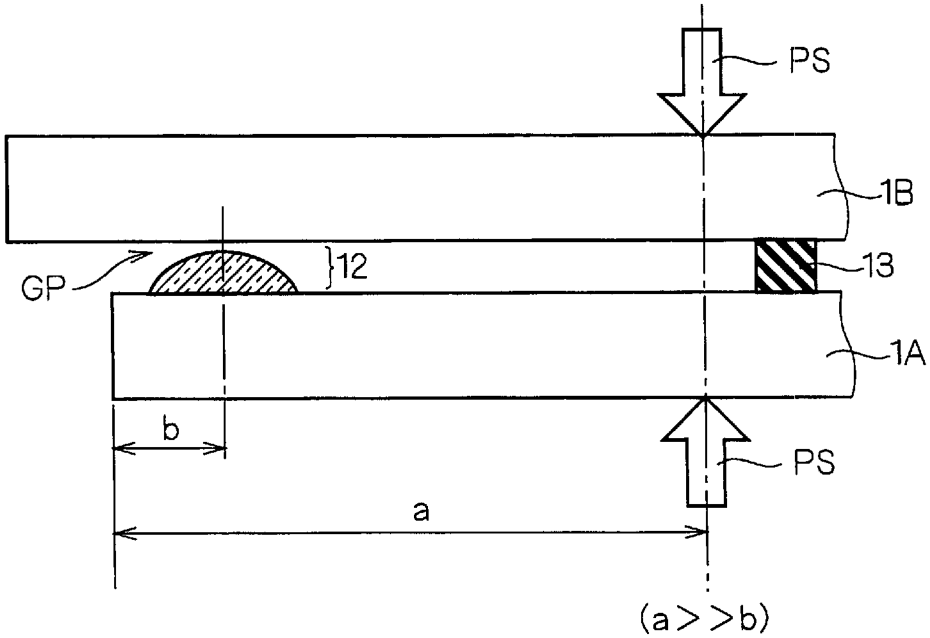

The flat display panels of this preferred embodiment can be applied to the plasma display panel 111 of the plasma display device 201 shown in FIG. 15, for example. Needless to say, they can be applied also to DC-type plasma display devices. They can also be applied to a wide variety of devices which fall under the category of flat display panels, such as vacuum fluorescent tubes etc. Such applications provide flat display devices having the effects of the above-described flat display panels.

Second Preferred Embodiment

The flat display panel of this preferred embodiment is a variation of the flat display panel of the first preferred embodiment. In this preferred embodiment, the crystallized glass paste and the amorphous glass paste are not disposed in the substrate thickness direction; the crystallized glass paste and the amorphous glass paste are disposed side by side in the substrate surface direction to form two parallel stripes.

Figure 6:
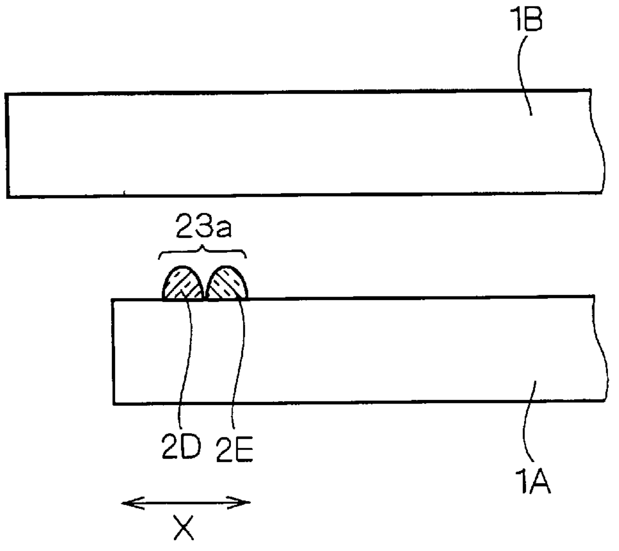
FIG. 6 is a sectional view showing the structure of a flat display panel according to a second preferred embodiment of the present invention, where the flat display panel has not been heated yet.
Figure 7:
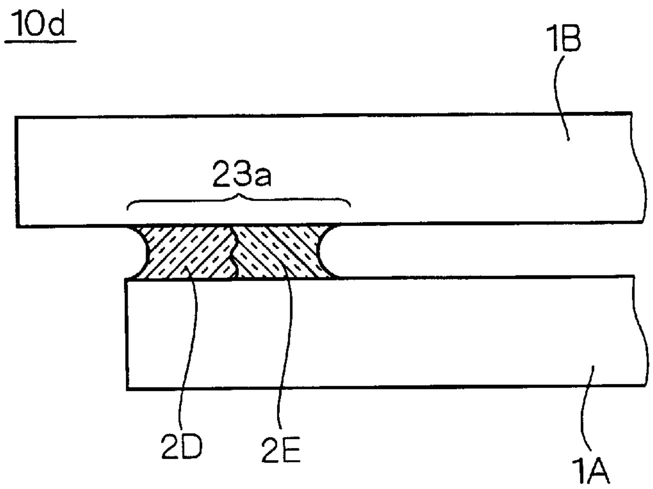
FIG. 7 is a sectional view showing the structure of the flat display panel of the second preferred embodiment of the present invention.

FIG. 7 is a sectional view showing the structure of a flat display panel 10*d* according to a second preferred embodiment of the present invention. FIG. 6 shows the section of the flat display panel which has not yet been heated and processed into the condition of FIG. 7.

Like the flat display panel 10*a* of the first preferred embodiment, the flat display panel 10*d* of this preferred embodiment comprises the two substrates 1A and 1B made of glass etc. and sealing layers 23*a* for bonding the substrates 1A and 1B together.

However, unlike those in the flat display panel 10*a* of the first preferred embodiment, the sealing layers 23*a* of this preferred embodiment have a two-stripe structure where a crystallized glass paste 2D and an amorphous glass paste 2E are arranged side by side in two stripes.

Also in this preferred embodiment, the thermal expansion coefficients of the crystallized glass paste 2D and the amorphous glass paste 2E are set approximately equal to those of the substrates 1A and 1B, respectively, to the extent that the seal between the two substrates 1A and 1B will not be broken; this can be achieved by adjusting materials mixed into the crystallized glass paste 2D and the amorphous glass paste 2E. It should be noted that the thermal expansion coefficients of the crystallized glass paste 2D and the amorphous glass paste 2E are set at different values.

The structure having two stripes is formed using materials which have different thermal expansion coefficients and different softening points, as the crystallized glass paste 2D and the amorphous glass paste 2E.

While the two-stripe structure of the crystallized glass paste 2D and the amorphous glass paste 2E is described herein as an example, it can be a structure having a larger number of stripes. Also in such a case, materials having different thermal expansion coefficients and different softening points are used as stated above.

For example, as shown in FIG. 6, the crystallized glass paste 2D and the amorphous glass paste 2E are disposed side by side on the substrate 1A. When the substrates are sealed together in this condition, the stress occurring in the sealing process can be alleviated and absorbed between the layers in the sealing part. This provides a hermetically sealed case which can keep a stable hermetic seal after it has been sealed off. The reason is as follows.

The sealing layers 23*a* include the crystallized glass paste 2D and the amorphous glass paste 2E; that is, the sealing layers include adjacent layers of different materials whose thermal expansion coefficients are approximately equal respectively to those of the two substrates 1A and 1B, and whose thermal expansion coefficients differ from each other. Therefore, the sealing layers can gradually alleviate and absorb the strain stress between the two substrates which is caused by the internal stresses generated in the two substrates 1A and 1B during the sealing process and after the cooling process.

For example, suppose that the substrate 1A has an internal stress directed rightward in the direction X shown in FIG. 6 (in the direction of the surface of the substrate 1A) and the substrate 1B has an internal stress directed leftward in the direction X of FIG. 6 (in the surface direction of the substrate 1B), and that the internal stress of the substrate 1B is smaller than the internal stress of the substrate 1A. In this case, the thermal expansion coefficients are adjusted so that the crystallized glass paste 2D and the amorphous glass paste 2E provide compressive stresses, with the compressive stress of the crystallized glass paste 2D being smaller than the compressive stress of the amorphous glass paste 2E. The sealing layers 23*a* can thus gradually alleviate and absorb the strain stress between the two substrates.

As compared with a conventional flat display panel having only one sealing layer, the hermetic seal can be improved to provide a flat display panel which can be kept airtight more stably. The flat display panel can thus be kept hermetically sealed even when the flat display device is subjected to external forces, such as vibrations and impacts, during its assembly process or transportation after cooling.

Furthermore, when the sealing layers contain materials having different softening points, as in the case of the crystallized glass paste 2D and the amorphous glass paste 2E, the heating and exhausting process can be stably performed by setting conditions so that the crystallized glass paste 2D having higher softening point will not be re-softened while being heated during the exhaust, even if the amorphous glass paste 2E having lower softening point is re-softened.

That is to say, even if the amorphous glass paste 2E is re-softened with heat during the exhaust process, the more stably heat-resistant crystallized glass paste 2D serves as a barrier to prevent the sealing materials from being sucked and drawn as they become softer while evacuated (i.e. it prevents change in shape). This enables stable heating and exhausting and facilitates the removal of impurity gas from the flat display panel.

Moreover, the sealing layers containing the crystallized glass paste 2D and the amorphous glass paste 2E as shown in this preferred embodiment can make full use of advantages of the two pastes, while canceling out their disadvantages.

That is to say, when the amorphous glass paste is used alone, the temperature must be set lower in the exhausting process than when the crystallized glass paste is used alone. However, when the sealing layers contain the crystallized glass paste 2D and the amorphous glass paste 2E as in this preferred embodiment, the crystallized glass paste 2D will not re-soften and thus serve, to some extent, to maintain the hermetic seal. It is therefore possible, to some extent, to ensure the hermetic seal even when the temperature is set somewhat higher than in conventional process. This, of course, compensates for reduction in dynamic strength etc., so that the hermetically sealed case can be kept airtight more stably after it has been evacuated.

On the other hand, when the crystallized glass paste, whose softening point is higher than that of the amorphous glass paste, is used alone, it must be heated for a longer time period than the amorphous glass paste to cause crystallization. However, when the sealing layers contain the crystallized glass paste 2D and the amorphous glass paste 2E as in this preferred embodiment, the heating time for causing crystallization can be set shorter by adjusting the amount ratio between the crystallized glass paste 2D and the amorphous glass paste 2E.

Furthermore, when the crystallized glass paste is used alone, it is difficult to achieve uniform bonding over the entire panel: when the temperature distribution largely varies during the heating, parts where the temperature increases slower melt while being affected by stress (strain) occurring in parts which have hardened earlier. Moreover, since the crystallized glass paste has poor fluidity, it is difficult to set conditions for the application of external pressure, so that the sealing layers may form uneven thickness after heated. However, when the sealing layers contain the crystallized glass paste 2D and the amorphous glass paste 2E as in this preferred embodiment, the amorphous glass paste 2E penetrates into parts where the crystallized glass paste cannot achieve uniform bonding, thus enabling uniform bonding.

Figure 8:
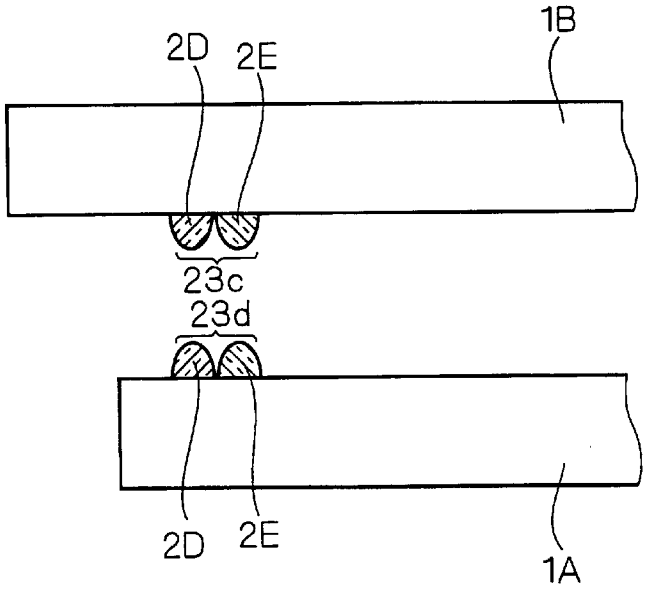
FIG. 8 is a sectional view showing the structure of a variation of the flat display panel of the second preferred embodiment of the present invention, where the flat display panel has not been heated yet.

FIG. 8 shows an example where the sealing layers are formed on both of the substrates 1A and 1B. In this way, sealing layers 23*c* and 23*d* of the crystallized glass paste 2D and the amorphous glass paste 2E may be formed on both substrates; the substrates are then bonded together to form the flat display panel 10*d* as shown in FIG. 7.

While the crystallized glass paste 2D is disposed outside on both of the substrates 1A and 1B and the amorphous glass paste 2E is disposed inside in this example, they may be arranged in the opposite manner.

A procedure for sealing the flat display panel according to this preferred embodiment is now described, where the flat display panel 10*d* is described as an example. (1) First, the sealing layers 23*a* are formed on the substrate 1A on which internal components, such as the barrier ribs, have been previously formed. The crystallized glass paste 2D is applied on the substrate 1A, which is dried and then pre-fired. (2) Next, similarly, the amorphous glass paste 2E is applied next to the crystallized glass paste 2D, dried, and pre-fired. The drying process is performed at 120 to 150° C. for about 10 minutes, and the pre-firing is performed at 380 to 400° C. for about 10 to 15 minutes for the crystallized glass paste 2D and at about 380° C. for about 10 to 15 minutes for the amorphous glass paste 2E. (3) Then positioning is achieved with the substrate 1A and the substrate 1B facing each other. (4) The two substrates are then fixed with a jig like a clip and appropriate pressure is applied to the sealing layers 23*a*. (5) The entire panel is heated. (6) The panel is cooled and the jig or clip is removed. (7) After the seal has been completed, the entire panel is evacuated, while being heated, through an exhaust tube previously attached to the panel, so as to remove impurity gas adsorbed in the panel. (8) A gas for discharge (a mixture gas containing Ne, Xe, etc.) is entrapped when the panel has reached a given temperature. (9) The exhaust tube is then sealed.

In the flat display panel of this preferred embodiment, a stress alleviating layer may be provided between the crystallized glass paste 2D and the amorphous glass paste 2E so as to alleviate stress between the two.

Figure 9:
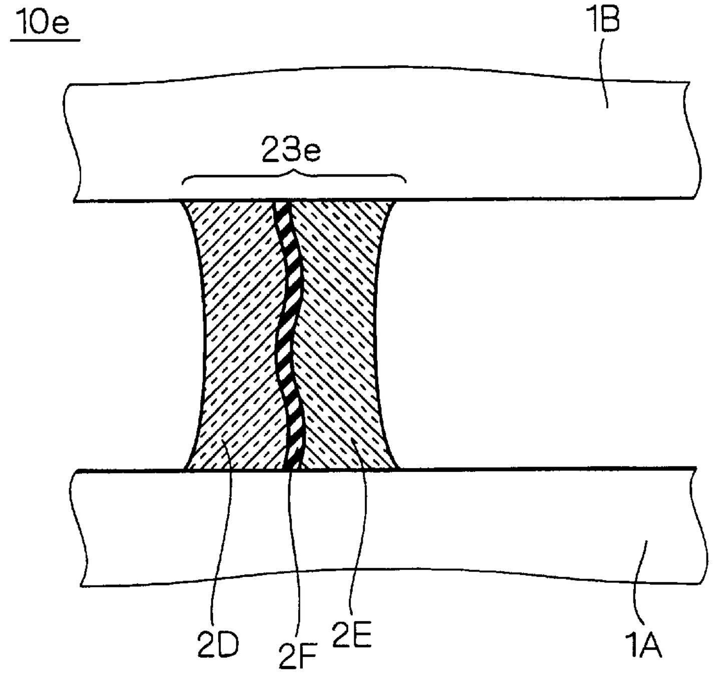
FIG. 9 is a sectional view showing the structure of a variation of the flat display panel of the second preferred embodiment of the present invention.

FIG. 9 is an enlarged view showing a flat display panel 10*e* which has been already heated and cooled, where the sealing layers 23*e* contain a stress alleviating layer 2F. In the seal where different sealing materials, i.e. the crystallized glass paste 2D and the amorphous glass paste 2E, are arranged so that they adjoin each other in the direction of the surface of the substrates 1A and 1B, another sealing material is provided as the stress alleviating layer 2F to alleviate and absorb internal stresses of the two materials.

For a method for forming this structure, the stress alleviating layer 2F is provided between the crystallized glass paste 2D and the amorphous glass paste 2E in the process of disposing them side by side as shown in FIG. 6. The stress alleviating layer 2F is formed using a material whose thermal expansion coefficient and softening point are respectively intermediate between the thermal expansion coefficients and softening points of the crystallized glass paste 2D and the amorphous glass paste 2E. More specifically, it can be a mixture of the crystallized glass paste 2D and the amorphous glass paste 2E.

Since the stress alleviating layer 2F thus has a thermal expansion coefficient intermediate between the thermal expansion coefficients of the crystallized and amorphous glass pastes 2D and 2E, it is possible to more gradually alleviate and absorb the strain stress between the two substrates 1A and 1B which is caused by their internal stresses. This offers a flat display panel having a stabler hermetic seal. Also, since the stress alleviating layer 2F thus has a softening point intermediate between the softening points of the crystallized and amorphous glass pastes 2D and 2E, the heating exhaust process can be performed more stably by setting conditions so that the crystallized glass paste 2D and the stress alleviating layer 2F will not re-soften while they are heated during the exhaust process, even if the amorphous glass paste 2E may re-soften.

The boundary between the crystallized glass paste 2D and the amorphous glass paste 2E actually forms an irregular plane rather than a flat plane. Thus, at the boundary between the materials, internal stresses in the crystallized glass paste 2D and internal stresses in the amorphous glass paste 2B are opposing each other in various directions. Therefore the stresses of the two materials cancel out each other, so that the materials are less likely to separate from each other. This provides a flat display panel with a stabler hermetic seal. This applies regardless of whether the stress alleviating layer 2F is present or absent.

The flat display panels of this preferred embodiment can be applied to the plasma display panel 111 of the plasma display device 201 shown in FIG. 15, for example. Needless to say, they can be applied also to DC-type plasma display devices. They can also be applied to a wide variety of devices which come under the category of flat display panels, such as vacuum fluorescent tubes etc. Such applications provide flat display devices having the effects of the above-described flat display panels.

Third Preferred Embodiment

The flat display panel of this preferred embodiment is a variation of the flat display panel of the first preferred embodiment. In this preferred embodiment, the crystallized glass paste and the amorphous glass paste are not disposed in the substrate thickness direction; the crystallized and amorphous glass pastes are alternately disposed in a line in the direction of the surfaces of the substrates.

Figure 10:
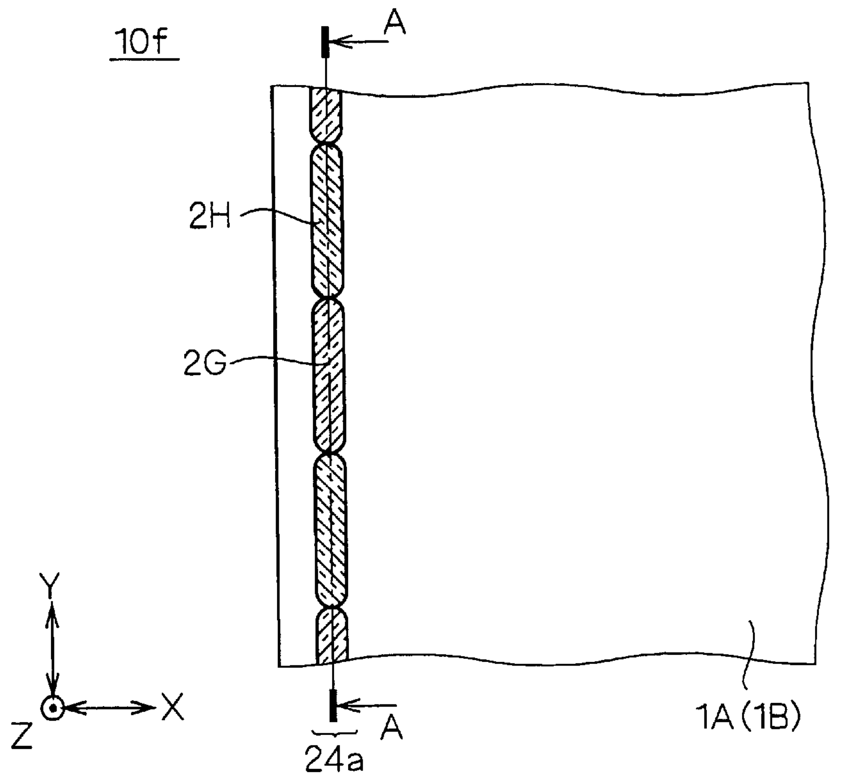
FIG. 10 is a top view showing the structure of a flat display panel according to a third preferred embodiment of the present invention.
Figure 11:
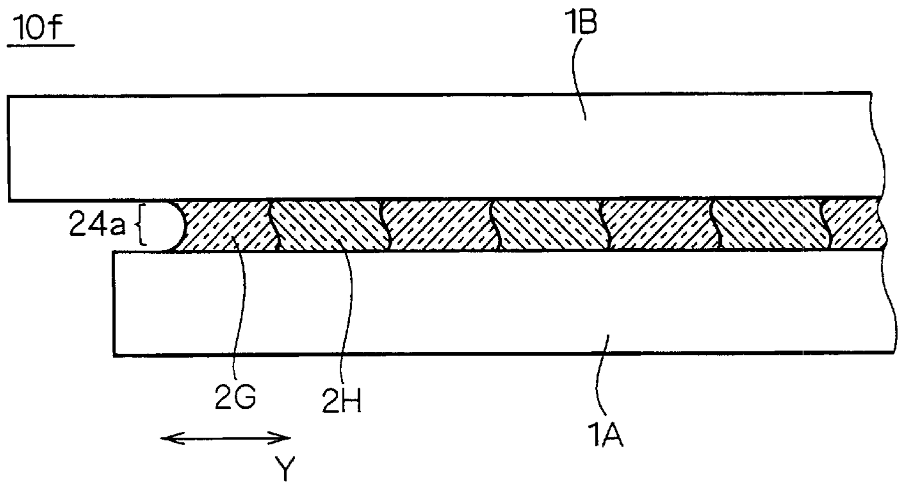
FIG. 11 is a sectional view showing the structure of the flat display panel of the third preferred embodiment of the present invention.

FIG. 10 is a top view showing the structure of a flat display panel **10*f* according to a third preferred embodiment of the present invention. FIG. 11 shows the section taken along the line A—A in FIG. 10**.

Like the flat display panel **10*a* of the first preferred embodiment, the flat display panel 10*f* of this preferred embodiment comprises the two substrates 1A and 1B made of glass etc. and sealing layers 24*a* for bonding the substrates 1A and 1B** together.

However, unlike those in the flat display panel **10*a* of the first preferred embodiment, the sealing layers 24*a* of this preferred embodiment contain a crystallized glass paste 2G and an amorphous glass paste 2H which are alternately arranged in a line (in the Y direction in FIG. 10**).

Also in this preferred embodiment, the thermal expansion coefficients of the crystallized glass paste 2G and the amorphous glass paste 2H are set approximately equal respectively to those of the substrates 1A and 1B, to the extent that the seal between the two substrates 1A and 1B will not be broken; this can be achieved by adjusting materials mixed into the crystallized glass paste 2G and the amorphous glass paste 2H. It should be noted that the thermal expansion coefficients of the crystallized glass paste 2G and the amorphous glass paste 2H are set at different values.

The structure arranged in a line is formed using materials which have different thermal expansion coefficients and different softening points, as the crystallized glass paste 2G and the amorphous glass paste 2H.

While the alternate arrangement of the crystallized glass paste 2G and the amorphous glass paste 2H is described herein as an example, it can be a structure having a larger number of materials. Also in such a case, materials having different thermal expansion coefficients and different softening points are used as stated above.

When the substrates are sealed together with the crystallized glass paste 2G and the amorphous glass paste 2H disposed alternately in a line, the stress occurring in the sealing process can be alleviated and absorbed in the sealing part. This provides a hermetically sealed case which can be kept stably airtight after it has been sealed off. The reason is now described.

The sealing layers **24*a* include the crystallized glass paste 2G and the amorphous glass paste 2H; that is, the sealing layers include adjacent layers of different materials whose thermal expansion coefficients are approximately equal respectively to those of the two substrates 1A and 1B, and whose thermal expansion coefficients differ from each other. Therefore, the sealing layers can gradually alleviate and absorb the strain stress between the two substrates which is caused by the internal stresses generated in the two. substrates 1A and 1B** during the sealing process and after the cooling process. It is also possible to intentionally disperse the stresses on the line, or in the line direction, in which the sealing layers are arranged. This stress dispersion provides more remarkable effect in panels with larger display areas.

As compared with a conventional flat display panel having only one sealing layer, the hermetic seal can be improved to provide a more stably airtight flat display panel. The hermetic seal of the flat display panel can thus be maintained even when the flat display device undergoes external forces, such as vibrations and impacts, during its assembly process or in transportation after cooling.

This preferred embodiment can be used in combination with the first and second preferred embodiments.

Figure 12:
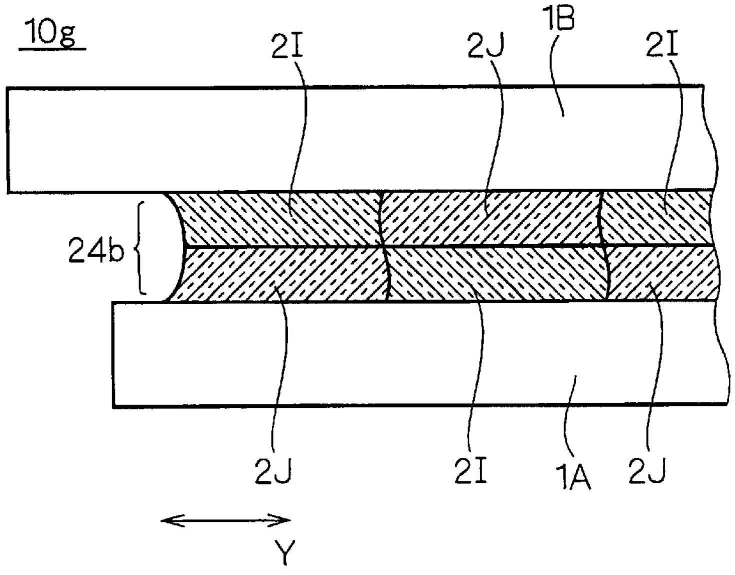
FIG. 12 is a sectional view showing the structure of a variation of the flat display panel of the third preferred embodiment of the present invention.

That is to say, the first preferred embodiment and this preferred embodiment can be combined to form sealing layers **24*b* as shown in the flat display panel 10*g* of FIG. 12 in which the stacked structure is employed in the one-line arrangement. In the sealing layers 24*b*, the crystallized glass paste 2J and the amorphous glass paste 21 have a stacked structure in which they are alternately arranged in inverse orders in the upper and lower layers extending in a line (in the direction Y shown in FIG. 12**).

Figure 13:
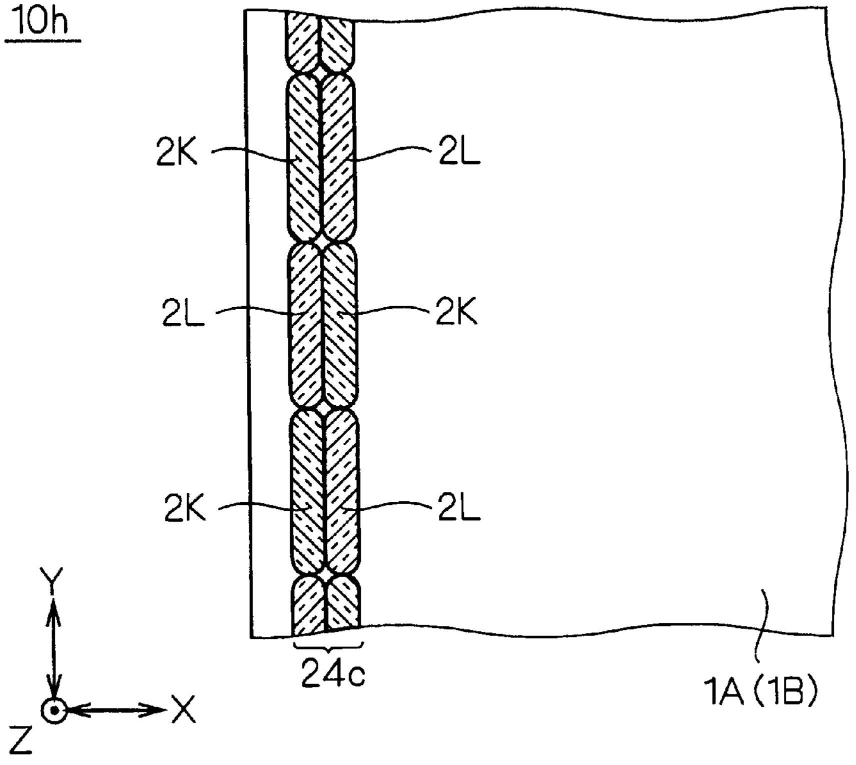
FIG. 13 is a top view showing the structure of a variation of the flat display panel of the third preferred embodiment of the present invention.

Also, the second preferred embodiment and this preferred embodiment can be combined to form sealing layers **24*c* as shown in the flat display panel 10*h* of FIG. 13 in which two sets of line structures are disposed side by side. In the sealing layers 24*c*, the crystallized glass paste 2L and the amorphous glass paste 2K are alternately disposed in each line (in the Y direction shown in FIG. 13) and the two materials are placed side by side also in the lines (in the X direction shown in FIG. 13**).

Fourth Preferred Embodiment

This preferred embodiment shows a flat display panel manufacturing method which provides optimum jig placement for fixing the two substrates in the process of applying appropriate pressure to the sealing layers.

Figure 14:
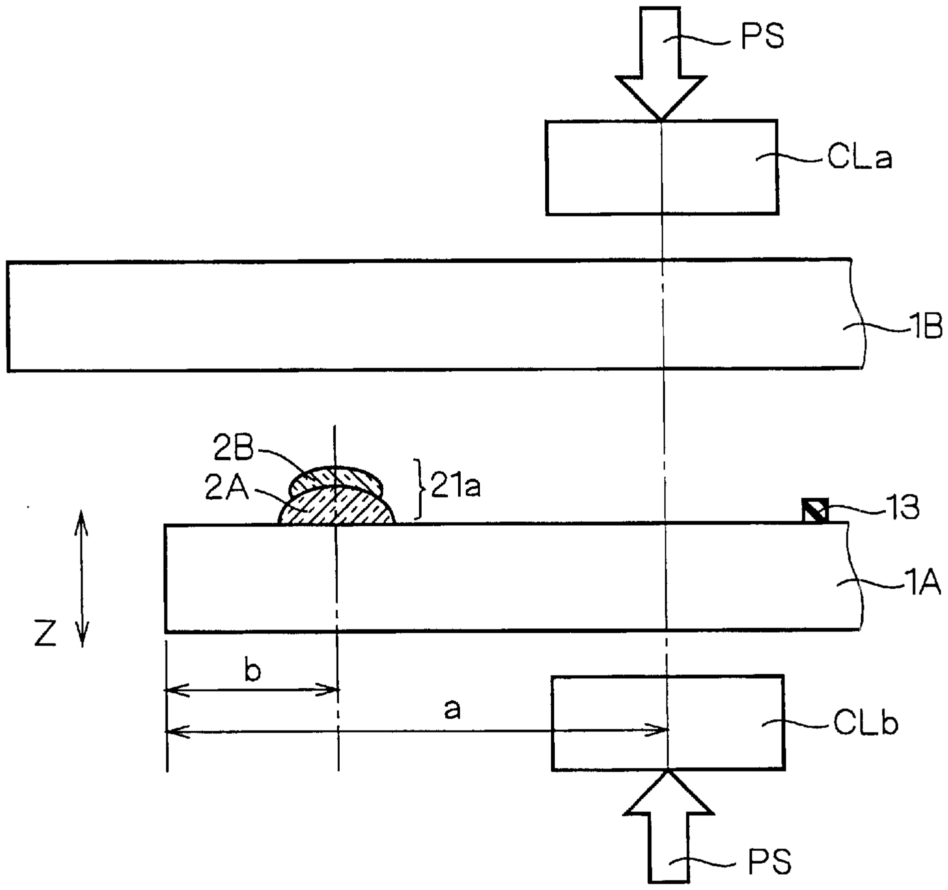
FIG. 14 is a diagram showing a flat display panel manufacturing method according to a fourth preferred embodiment of the present invention.

FIG. 14 shows the relation between the pressurizing position and the position of formation of the sealing layers, where the flat display panel 10*a* is explained as an example; in this process, the two substrates 1A and 1B are put into a heating furnace, with a jig (clip) CLa and CLb externally applying pressure PS to the two substrates to press them together.

The inventor of this invention has carried out many experiments to obtain the optimum positioning of the jig and has found that the pressure PS can be satisfactorily applied when it is located near the sealing layers 21*a* and inside the sealing layers on the panel. For the optimum positioning, it has become clear that the deformation of substrate ends, which would happen as explained earlier, and the leakage of the discharge gas are least likely to occur when the ratio between the distance "a" from the end of the substrate 1A to the position where the pressure PS is applied and the distance "b" from the end of the substrate 1A to the center of the formation width of the sealing layers 12 approximately falls in the range of a:b=2:1 to 10:1. This allows the substrates 1A and 1B to be spaced at approximately constant interval at the substrate edges and in the center of the panel, satisfying the flat display panel characteristic seriously requiring uniform display.

That is to say, this prevents application of excessive pressure to the sealing layers 21*a* and thus prevents the sealing layers 21*a* from being unnecessarily enlarged in width. The passage of gas exhausted from inside the two substrates can thus be easily ensured. This also prevents application of insufficient pressure to the sealing layers 21*a* and thus suppresses formation of gaps between the two substrates.

Moreover, the sealing layers, after sealed, provide approximately uniform width along the entire periphery and thus prevent occurrence of nonuniform internal stresses. Also, the sealing layers can be formed in smaller width (i.e. it occupies smaller area) while maximizing the display area and can offer uniform sealing width, as is required for bonding.

This preferred embodiment can be combined with the above-described preferred embodiments, and can be effectively applied also to conventional flat display panels.

While the invention has been described in detail, the foregoing description is in all aspects illustrative and not restrictive. It is understood that numerous other modifications and variations can be devised without departing from the scope of the invention.

What is claimed is:

1. A flat display panel comprising:

first and second substrates; and a plurality of sealing layers which adjoin each other, said first and second substrates being sealed together with said plurality of sealing layers, wherein said plurality of sealing layers have different thermal expansion coefficients from each other, and said plurality of sealing layers form a stacked structure between said first and second substrates.

2. A flat display panel comprising:

first and second substrates; and a plurality of sealing layers which adjoin each other, said first and second substrates being sealed together with said plurality of sealing layers, wherein said plurality of sealing layers have different thermal expansion coefficients from each other, and said plurality of sealing layers are arranged in a line between said first and second substrates.

3. The flat display panel according to claim 1, wherein said plurality of sealing layers comprise a first sealing layer comprising a crystallized glass paste and a second sealing layer comprising an amorphous glass paste.

4. The flat display panel according to claim 1, wherein said plurality of sealing layers comprise, a first sealing layer having a first thermal expansion coefficient, a second sealing layer having a second thermal expansion coefficient which is lower than said first thermal expansion coefficient, and a third sealing layer provided between said first sealing layer and said second sealing layer and having a third thermal expansion coefficient which is lower than said first thermal expansion coefficient and higher than said second thermal expansion coefficient.

5. The flat display panel according to claim 4, wherein one of said first and second sealing layers comprises a crystallized glass paste and the other comprises an amorphous glass paste, and said third sealing layer comprises a mixture of the crystallized glass paste and the amorphous glass paste.

6. The flat display panel according to claim 1, wherein said plurality of sealing layers comprise a first sealing layer having a first softening point and a second sealing layer having a second softening point which is lower than said first softening point.

7. The flat display panel according to claim 6, wherein said plurality of sealing layers further comprises a third sealing layer provided between said first sealing layer and said second sealing layer, said third sealing layer having a third softening point which is lower than said first softening point and higher than said second softening point.

8. The flat display panel according to claim 7, wherein said first sealing layer comprises a crystallized glass paste, said second sealing layer comprises an amorphous glass paste, and said third sealing layer comprises a mixture of the crystallized glass paste and the amorphous glass paste.

9. The flat display panel according to claim 1, wherein irregularities exist at an interface between said plurality of sealing layers.

10. A flat display device comprising:

said flat display panel according to claim 1, and a flat display panel driving circuit for controlling driving of said flat display panel.

11. The flat display panel according to claim 2, wherein said plurality of sealing layers comprise a first sealing layer comprising a crystallized glass paste and a second sealing layer comprising an amorphous glass paste.

12. A flat display device comprising:

said flat display panel according to claim 2, and a flat display panel driving circuit for controlling driving of said flat display panel.

* * * * *